(No Model.) 7 Sheets—Sheet 3.

C. H. COOLEY & F. H. RICHARDS.
GRAIN WEIGHER.

No. 447,762. Patented Mar. 10, 1891.

Inventors:
C. H. Cooley
F. H. Richards

Witnesses:
W. M. Bjorkman
Henry L. Reckard (No Model.) 7 Sheets—Sheet 4.

C. H. COOLEY & F. H. RICHARDS.
GRAIN WEIGHER.

No. 447,762. Patented Mar. 10, 1891.

(No Model.) 7 Sheets—Sheet 5.

C. H. COOLEY & F. H. RICHARDS.
GRAIN WEIGHER.

No. 447,762. Patented Mar. 10, 1891.

Witnesses: W. M. Bjorkman, Henry L. Reckard.

Inventors: C. H. Cooley, F. H. Richards.

THE NORRIS PETERS CO., PHOTO-LITHO., WASHINGTON, D. C.

(No Model.) 7 Sheets—Sheet 6.

C. H. COOLEY & F. H. RICHARDS.
GRAIN WEIGHER.

No. 447,762. Patented Mar. 10, 1891.

Witnesses:
Wm. Bjorkman
Henry L. Reckard

Inventors:
C. H. Cooley
F. H. Richards (No Model.) 7 Sheets—Sheet 7.

C. H. COOLEY & F. H. RICHARDS.
GRAIN WEIGHER.

No. 447,762. Patented Mar. 10, 1891.

Witnesses:
Inventors:

UNITED STATES PATENT OFFICE.

CHARLES H. COOLEY AND FRANCIS H. RICHARDS, OF HARTFORD, CONNECTICUT, ASSIGNORS TO THE PRATT & WHITNEY COMPANY, OF SAME PLACE.

GRAIN-WEIGHER.

SPECIFICATION forming part of Letters Patent No. 447,762, dated March 10, 1891.

Application filed August 23, 1890. Serial No. 362,907. (No model.)

*To all whom it may concern:*

Be it known that we, CHARLES H. COOLEY and FRANCIS H. RICHARDS, citizens of the United States, residing at Hartford, in the county of Hartford and State of Connecticut, have invented certain new and useful Improvements in Grain-Weighers, of which the following is a specification.

This invention relates to grain weighing and bagging machines, and has for its object the adaptation for the bagging of grain of the grain-weighing improvements embodied in our prior applications and also to furnish means for accurately weighing the grain into bags of different sizes and heights.

In the drawings accompanying and forming a part of this specification.

Similar characters designate like parts in all the figures.

The machine shown in the drawings consists of a frame-work, the scale-beam B and its counterpoise, a supply-chute, and a cut-off and a reducing valve for said chute, and valve-actuating mechanism, whereby the cut-off and reducing valves are actuated from the scale-beam, all substantially as shown and described in Letters Patent of the United States No. 442,724, granted to Cooley and Richards December 16, 1890. These several features of the machine may be briefly described as follows:

The frame-work for carrying the operative parts of this machine usually, and as shown in the drawings, comprises two suitable side frames or uprights, as 2 and 4, which may be held together by the top plate 5 (carrying the supply-chute H) and by the bottom plate or bar 3, herein shown formed integral with the side frames; or the side frames may be separate and held together by suitable tie-rods and braces, as shown in the prior Letters Patent No. 403,988, granted to C. H. Cooley May 28, 1889.

The scale-beam B consists of a central shaft 50, two bucket-supporting arms 19 and 21, provided at their outer ends with the usual knife-edges 15 and 17, on which to suspend the hangers, a weight-supporting arm 28, oppositely disposed on said shaft relatively to said arms 19 and 21 and having a suitable knife-edge 27, on which to suspend the main weight, and bearings which are adapted to rest on the beam supporting knife-edges 24 and 26, that are carried by the frame-work. This feature of our present machine is also described and is claimed in Letters Patent of the United States No. 440,740, granted to Cooley and Richards November 18, 1890.

For counterbalancing the hangers and the bucket mechanism carried thereby and the load of grain, we employ the improved weight shown in the Letters Patent of the United States No. 442,816, granted to Cooley and Richards December 16, 1890, in which the main weight W of a mass balancing the unloaded bucket mechanism is suspended from the arm 28 of the scale-beam by the rod 32. A circular cover 104 is fixed to the top of the main weight, and on this cover rest the several load-weights, which together should equal in weight the load of grain. The cylindrical cover 105 is fitted to slide up and down on the suspension-rod, and is preferably formed conical at top, as shown, for the purpose of shedding grain-dust, &c., falling thereon.

The stop shown herein for limiting the vertical movements of the counter-weight is of the type shown and described in the Letters Patent of the United States No. 442,720, granted to F. H. Richards December 16, 1890, to which reference may be had for a more particular description thereof. In the drawings are shown the bracket 108, the rod 32, and the sleeve 121, fixed to said rod by the key 119, said sleeve having the upper stop-collar 122 and the lower stop-collar 123 formed thereon, as shown in said Letters Patent.

The valve mechanism for reducing and for cutting off the flow of grain to the bucket is actuated from and by the scale-beam. The reducing-valve 60 is carried by the arms 62 and 64, that are carried on the pivots 61, said valve being furnished, if desired, with a suitable adjustable stop to regulate or limit its closing movement. This valve 60 closes under the outlet 65 of the chute H, somewhat more than half the width thereof. The valve is actuated by the valve-lever 69 from the valve-actuating arm 71 of the beam B. The construction and mode of operation of this reducing-valve in its preferred form are fully set forth in the aforesaid Letters Patent No. 442,724, to which reference may be had.

The cut-off valve 70 is carried by the arms 72 and 74, pivoted at 73 to the supply-chute H, the said valve having, if desired, an adjustable stop to limit its closing movement. The arm 72 is continued above the pivot 73 and carries the cam 68 and some suitable weight, as 90. The actuator 55, which in this case is a small roller carried by the arm 54, is carried at a fixed point on the beam-arm 19, as shown. The cam 68 being above the pivot 73 of the cut-off valve, and the valve-arm being of a short radius, the cam follows the beam in its downward movement, and thus has a more direct and effective action thereon. This arrangement and combination of the several parts enables us to use a large angular movement of the valve relatively to the extent of the beam movement, thereby obtaining a long stroke for the weight 90 on the arm of the cut-off valve.

For a more particular description of the operation of the cam-arm on the beam subsequent to the poising, whereby the weight of said arm is thrown upon the beam for a special purpose, reference is made to the Letters Patent of the United States No. 442,722, granted to C. H. Cooley December 16, 1890. When the scale-beam is carried down by the completed load, (which, however, is then very nearly counterpoised, and thus has no material effective weight,) power is furnished by said cam-arm bearing on the beam to disengage the detent-latch of the drip-catching apparatus, and thus discharge said drip into the bag. In said prior Letters Patent No. 442,722 a combination is described having a similar function, and wherein force thus thrown upon the beam subsequent to the poising is used for disengaging bucket-catches for discharging the grain-bucket of the grain-weigher. As in said Letters Patent, so also in our present improvements, said cam-arm may be separate from the cut-off valve; but it is deemed preferable that said arm should be fixed on the valve, since by this means the weight of the valve is utilized for overweighting the beam, and the cam is utilized for operating the valve.

Figure 3:
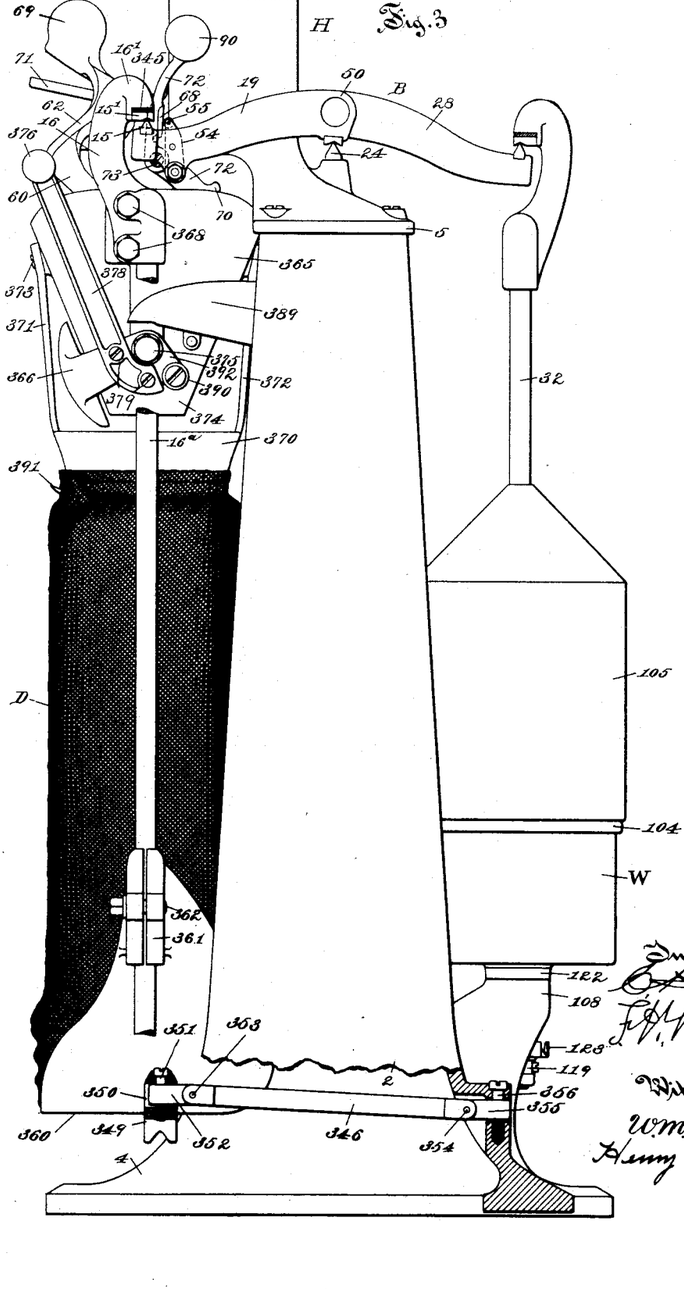
Fig. 3 is a side elevation of the machine as seen from the right hand in Fig. 1 with some parts broken away for illustrating certain details of construction. In this view the bag D is shown in place for receiving its load.
Figure 4:
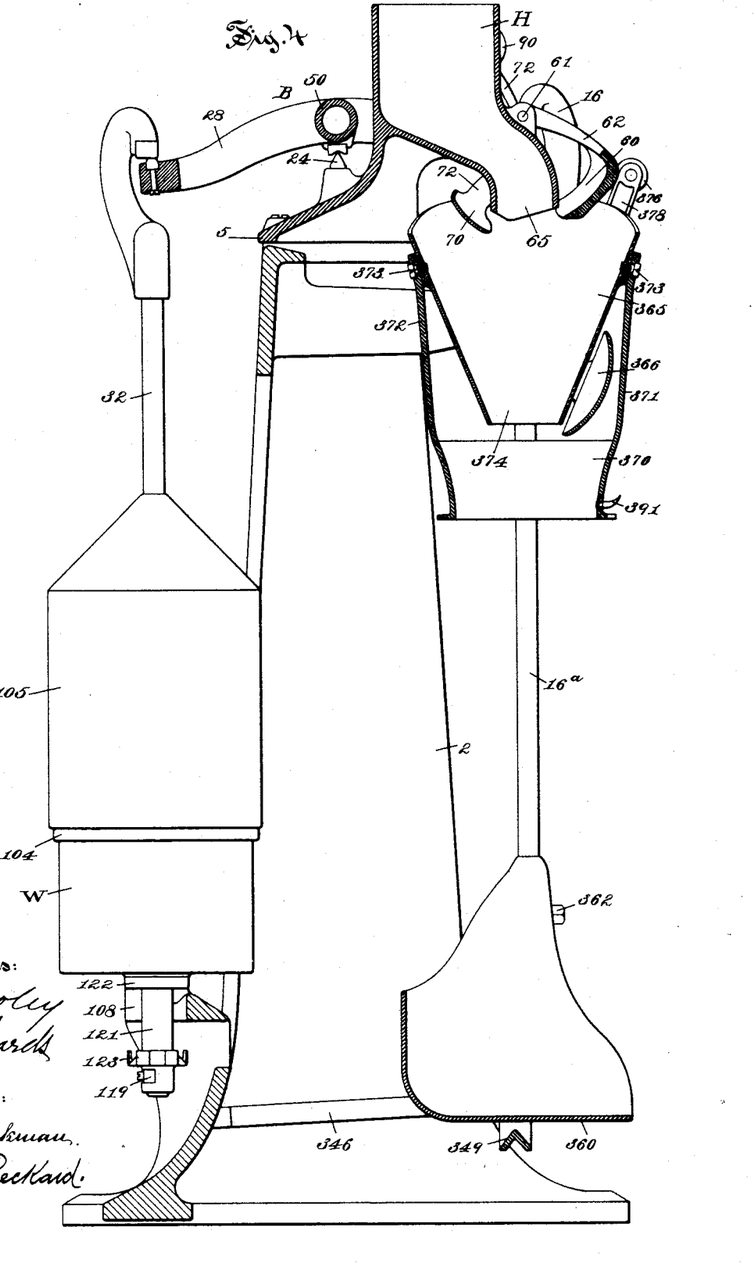
Fig. 4 is a vertical sectional elevation corresponding in position to Fig. 2.
Figure 5:
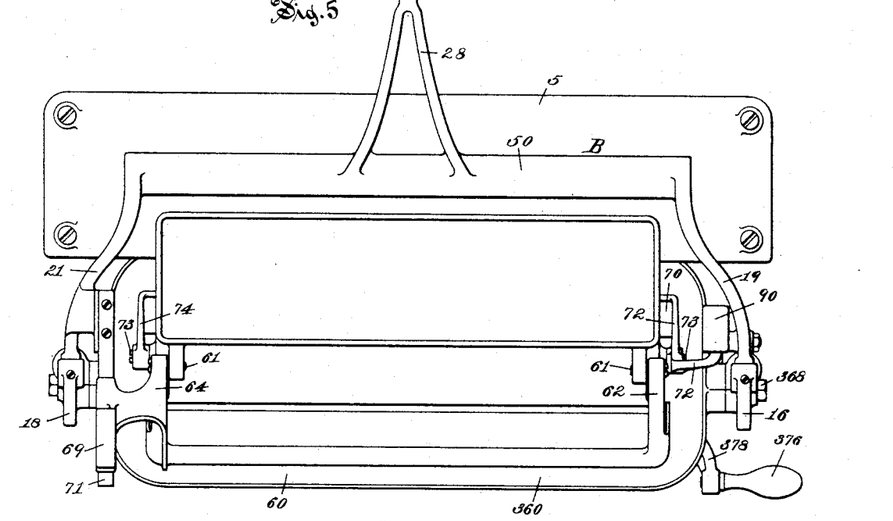
Fig. 5 is a plan view of the upper part of the machine, some details being omitted.
Figure 6:
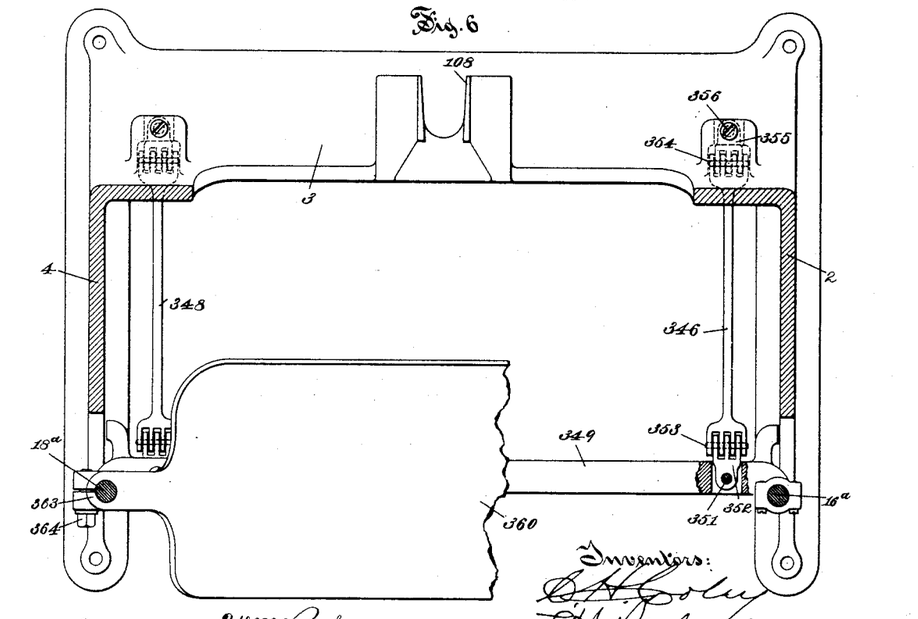
Fig. 6 is a plan view of the details at the lower part of the machine, some parts, including the frame, being shown in section and others broken away the better to show the construction and arrangement of minor details.
Figure 7:
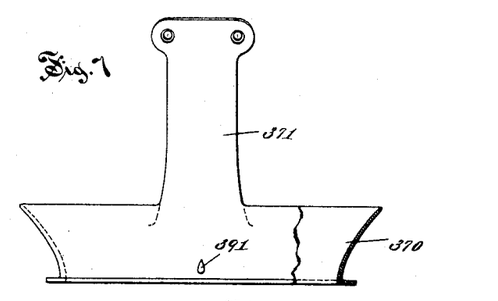
Fig. 7 is a front view, partially in section, of the bag-holder.
Figure 8:
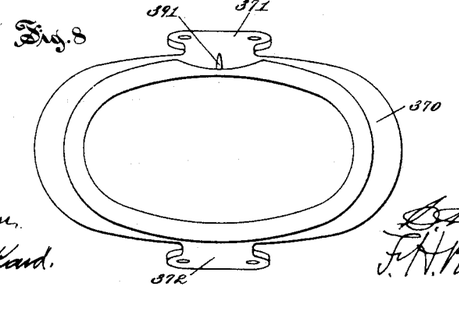
Fig. 8 is a plan view of the under side of the bag-holder.

In our present improvements, instead of suspending a grain-bucket from the forward end of the scale-beam, as in ordinary grain-weighing machines, we substitute for said bucket bag-supporting devices suspended from said beam and carrying thereon one of the principal features of our present invention, which feature consists in a drip-catching apparatus having a catch-valve or drip-holder, as 366, that is arranged to have successive movements, whereby it first allows the grain to flow unobstructed into the bag, next intercepts or catches the column of grain, and then discharges the load into the bag. The two hangers 16 and 18 are suspended from the beam-arms 19 and 21, respectively, of the scale-beam B by means of the knife-edges and bearing-blocks described in our aforesaid Letters Patent, the knife-edges 15 and 17 being carried on said arms, respectively, while the blocks 15' and 17', together with the guards 345 and 347, are fixed under the hooks 16' and 18' of said hangers, respectively. The lower ends of the hangers are connected by a cross-bar 349, suitably affixed thereto at each end of said bar; and for preventing any undue swaying movement forward and backward of the lower end of the hangers these are connected by some suitable stay-rods—as, for instance, the rods 346 and 348—to fixed points of the frame-work, whereby slight sidewise movement is permitted, and also the vertical movement derived from the rising and falling of the beam. Said stay-rods are or may be of similar construction, so that a description of one of them will suffice. The cross-bar 349 has therein a mortise 350, through which is inserted a screw or pin 351, which passes through the jointed end 352 of the stay-rod, which end is connected by a pivot-pin 363 to the principal part of the stay-rod, as shown in Figs. 3 and 6. The rearward end of the said principal part of the stay-rod 346 is connected by a similar pin 354 to the rearward stay-rod end 355, which is similarly carried by a screw or pin 356, fixed in the frame of the machine, as will be understood by comparison of Figs. 3 and 6. In order that the pivots 353 and 354 may be of a very small diameter, and thus reduce to a minimum the friction due to the vertical movement of the cross-bar 349, the said rod is preferably made as shown in Fig. 6, with the ends thereof divided into several arms which interlock with the arms of the stay-rod ends 352 and 355, thus furnishing several separate bearings, whereby a very small wire pivot—in practice about one-eighth of an inch in diameter for an ordinary size of machine—may be used. It will be understood, however, that the principal features of our improvements are not limited to the use of this particular form of stay-rod, since other and well-known forms of stay-rods are adapted to be used for said purpose and are shown in prior Letters Patent.

As a means for connecting the cross-bar 349 to the lower ends of the hangers, the ends or hubs 357 and 359 of said cross-bar are slotted to receive the rectangular keys 358, which also engage in corresponding notches extending into the hanger-rods $16^a$ and $18^a$, thus positively locking said rod and bar together after the manner described for locking the sleeve to the weight-rod 32 in the Letters Patent of the United States No. 442,720, granted to F. H. Richards December 16, 1890. As a substitute for this preferable mode of connecting said parts, the cross-bar may be attached to said hanger-rods by set-screws, or may be pinned thereto in a well-known manner.

Figure 1:
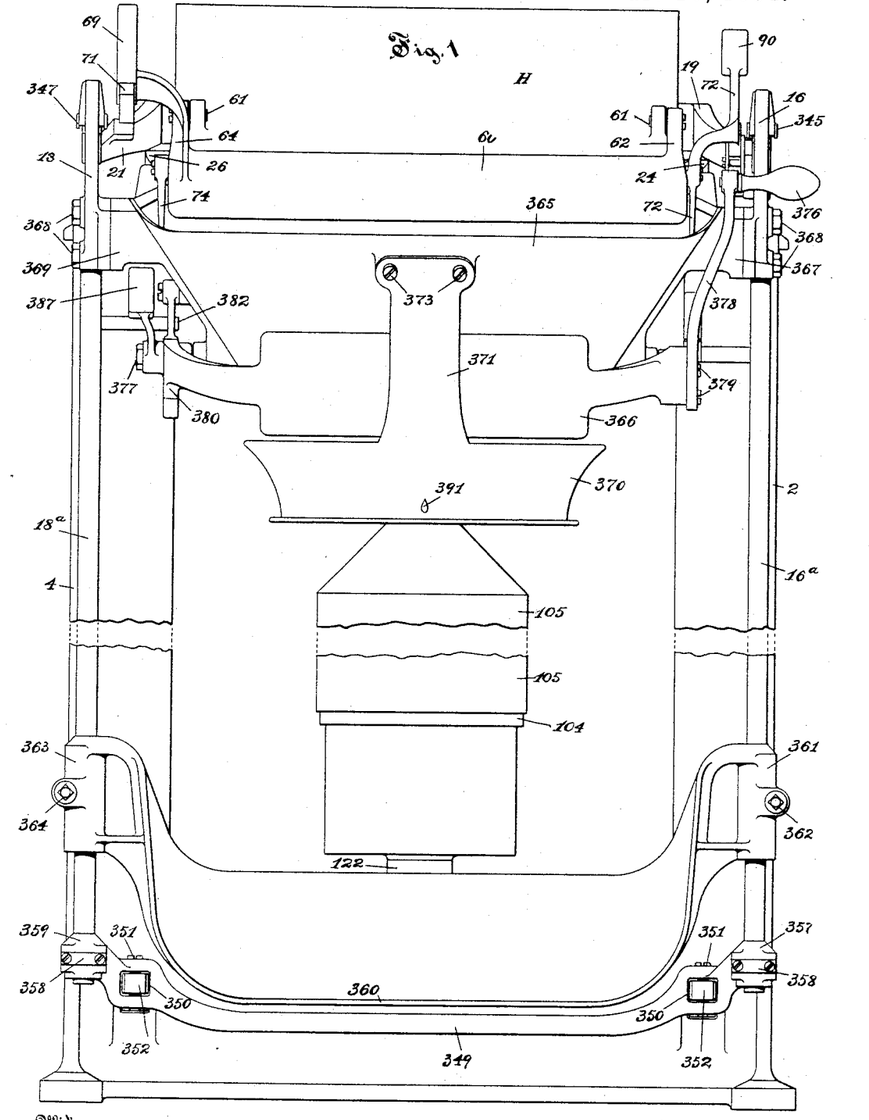
Figure 1 is a front elevation of a grain weighing and bagging machine embodying our improvements, the middle portion being broken away for the purpose of shortening the height of the view.
Figure 2:
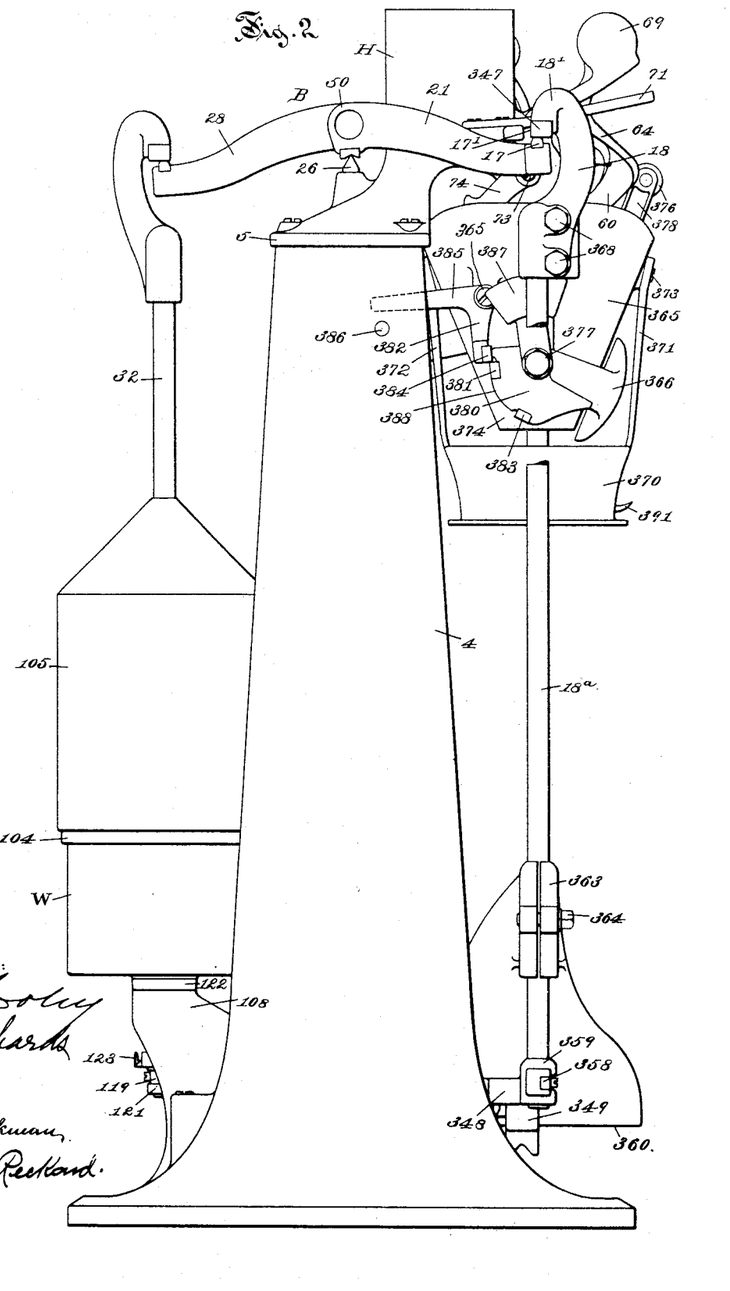
Fig. 2 is a side elevation of the same as seen from the left hand in Fig. 1.

The bag-seat consists of a shelf 360, whose ends are formed into suitable hubs, as 361 and 363, which are bored to fit and slide on the hanger-rods $16^a$ and $18^a$, respectively, for the purpose of making said bag-seat adjustable vertically of the hangers to accommodate different sizes of bags. As a means for holding in place the bag-seat, the hubs 361 and 363 are slotted and provided with clamp-screws 362 and 364, whereby the hubs may be clamped upon the said hanger-rods in a well-known manner, which will be understood by comparison of Figs. 1, 3, and 6. In Fig. 1 the bag-seat is shown in its lowermost position. By loosening the clamp-screws 362 and 364 it may be elevated as required and securely fastened on the hanger-rods by tightening said screws.

Figure 9:
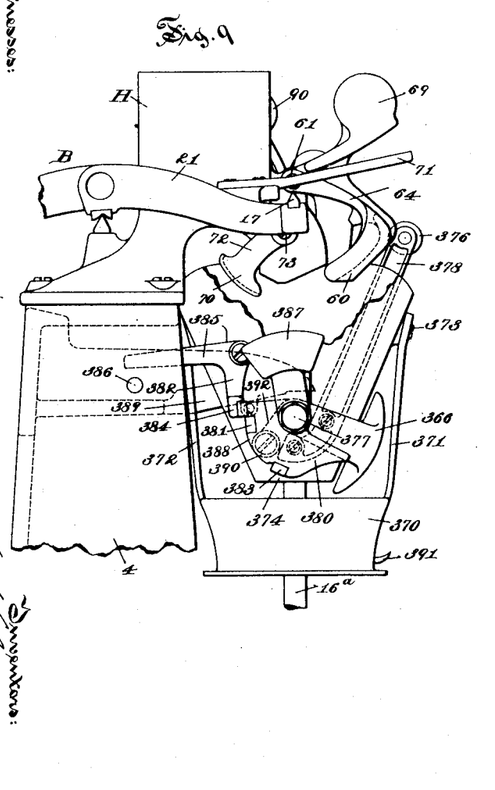
Figs. 9, 10, and 11 are a series of views similar to the upper part of Fig. 2 for illustrating the operation of the valve mechanism.

Secured in place between the hangers and near the upper end thereof there is a catch-pan 365, which is located immediately below the supply-chute and cut-off valves and which is provided with a drip-holder catch-valve 366, whereby the "drip" is retained in the pan until the load is completed, when the drip or "minor" part of the load is discharged into the bag. This is for the purpose, hereinafter more fully set forth, of making uniform a feature of the operation which otherwise would be variable, and thus lead to error in weighing. The catch-pan 365 is carried by its projecting arms or bosses 367 and 369, which are rigidly secured to the upper ends of the hangers by the screws 368, as will be clearly understood from the drawings. The bag-holder 370, provided with a hook 391 for securing the bag, is connected to the sides of said pan by its arms 371 and 372 and by screws 373, so as to leave some space between the discharge-spout 374 of said pan and said bag-holder wherein the catch-valve 366 may be operated by swinging it to its successive positions shown, respectively, in Figs. 9, 10, and 11. The catch-valve is carried on two studs 375 and 377, fixed in the ends of the catch-pan, and is operated by hand by means of a handle 376, whose arm 378 is fixed to the valve in any suitable manner—as, for instance, by screws 379. The catch-valve has thereon a stop-segment 380, which carries two stops 381 and 383, the first of which is for holding the catch-valve in the position shown in Fig. 9 and the second for holding it in the position shown in Fig. 10. For thus holding said valve by said catches a latch-arm 382, provided with a corresponding catch 384, is pivoted to the catch-pan at 393 and has a projecting arm or lever 385, which is operated by some suitable stop, as 386, on the frame-work of the machine. For operating the catch-valve it is furnished with a suitable weight, as 387, whose exact position circumferentially of the valve-axis and whose mass and weight are experimentally determined in each particular case, so as to properly counterpoise the catch-valve itself, so that when the valve is opened for starting the machine, as shown in Fig. 9, it will have a tendency to fall on the uncatching of the latch 382 to the position shown in Fig. 10, where it is caught by the second stop 383. On the further operation of the machine, when the latch is detached from the second stop 383, said weight acts to throw the valve into its back or "final" position, (shown in Fig. 11,) where the catch-pan is again shown open.

Figure 10:
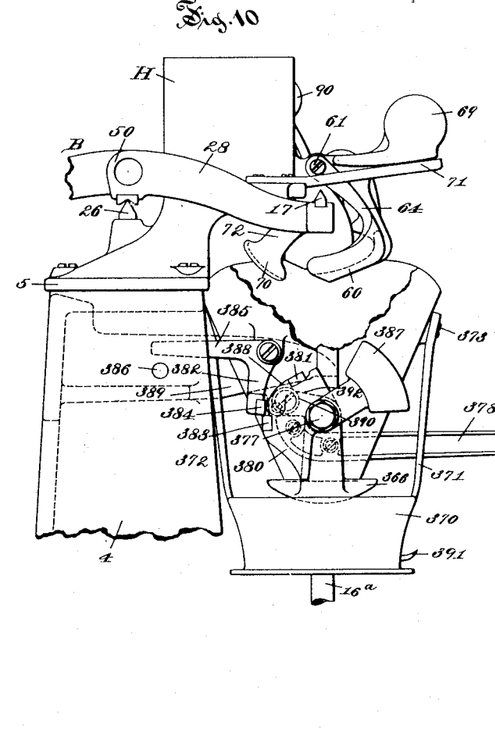

As a means for rendering the detent-latch 382 operative in connection with the first and second stops 381 and 383, said second stop is placed at a somewhat greater radius from the catch-valve axis, so that on the first descent of the catch-pan from its position in Fig. 9 to its position in Fig. 10 the stop 386 on the frame, acting through the lever 385 of the stop-latch, lifts the catch 384 from the first stop 381 of the catch-valve, the intermediate part 388 of the stop-segment acting as a cam to throw the detent-latch into the position shown in Fig. 10, where said lever or arm stands at some distance above said fixed stop 386. This requires a farther downward movement of the catch-pan and scale-beam before the latch 382 will be detached from said second stop, as in Fig. 11, said downward movement of the beam and pan being the movement for cutting off the drip, which takes place in all grain-weighers of the class described in our aforesaid Letters Patent No. 442,724, and wherein the two supply-chute valves close in succession.

Figure 11:
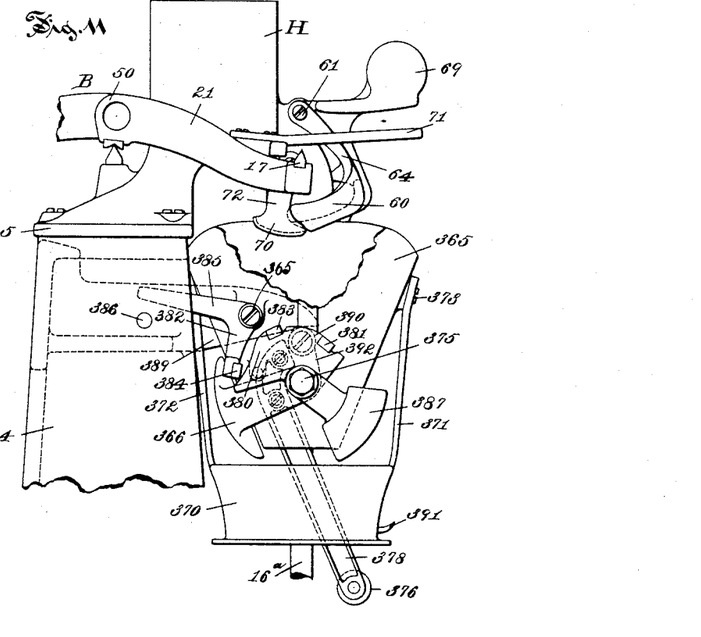

Having delivered a load of grain into the bag and the machine having reached the point shown in Fig. 11, it is necessary to prevent opening the supply-chute before the bag has been removed and another bag placed on the machine. For this purpose a fixed arm or abutment 389 is provided on the frame-work, and the catch-valve is provided with a lock-arm 392, carrying a roll 390, which is so arranged relative to said valve and to said abutment 389 that on the final movement of the catch-valve said roll comes into the position shown in dotted lines in Fig. 11, directly over the valve-axis and under said abutment, thus blocking or locking the scale-beam down and stopping the machine. The abutment lower or working face is crosswise to the direction of the hanger movement, and the lock-arm on the final movement of the catch-valve comes substantially vertical to said face. By this means, the valve having a handle rigidly connected thereto, the valve-handle and said lock-arm together constitute in effect a single lever, whereby the operator may control by hand the upward movement of the scale-beam to open the supply-chute, and thus start the machine. During this operation the roll 390 runs along on said abutment-face as the arm 392 swings on its axis through its successive positions. (Shown in dotted lines in Figs. 9, 10, and 11.)

To start the machine, the operator takes the catch-valve by the handle 376 and forcibly carries the handle by a steady continuous movement from its position in Fig. 11 to the position shown in Fig. 9, thus permitting the catch-pan to rise, (it being carried up by the counterpoise-weight,) and the beam-arms open the supply-valves in the usual manner, and thus deliver the grain through the open catch-pan and through the bag-holder into the bag D. When the "major part" of the load of grain is delivered into the bag, the reducing-valve closes, as in Fig. 10, thus bearing down the beam, and by bringing the arm 385 against the stop 386 disengages the detent-catch 384 from the valve-catch 381, thus allowing the weighted catch-valve to close the catch-pan, as also shown in Fig. 10, and thus retain therein the "minor part" of the load, usually denominated as the "drip." The grain now continues to flow slowly or drip into the catch-pan until the grain in the bag and that in the catch-pan together constitute the full load and bear down the beam, as in Fig. 11, thus entirely cutting off the supply and again bringing the arm 385 against the stop 386, thereby disengaging the said detent-catch from the second valve-catch 383, when the valve again moves as before, now passing beyond the discharge-outlet of the catch-pan and discharging the drip part of the load into the bag, and also, as above described, locking the scale-beam down until it shall be again permitted to rise by the operator raising the aforesaid lever. The drip being caught or intercepted, as set forth, by a drip holder or receptacle immediately under the supply-chute, the fall thereof is through the space of a few inches only and is substantially uniform in quantity, weight, momentum, and force of impact whatever be the size or height of the bag being loaded. This uniformity of the said several effective conditions and forces is found to be highly important to the successful use of automatic weighing-machines for the bagging of grain.

It will be understood from the drawings and from the foregoing description of the construction and operation of the mechanism that in the drip-catching apparatus the principal feature is the movable drip-holder or "catch-valve," which when the machine is started in operation first stands free of the descending column of grain, then intercepts said column, and finally discharges its load into the receptacle below, and that the catch-pan is a device adjunctive to the drip-holder, whereby said holder is permitted to be in any particular case of less size and to have a less working-stroke. If the catch-pan be dispensed with, of course suitable means should be substituted therefor for holding the drip-holder pivots and for carrying the detent-latch, said means being carried by the hangers. For this purpose suitable castings or brackets similar in shape to the end portions of the catch-pan shown may be fixed to the hangers, as the ends of said pan are fixed in the present instance and as will be obvious to those acquainted with this class of machinery. We prefer, however, for the reasons herein set forth, to use a catch-pan substantially as shown, since this furnishes a suitable means of connecting the hangers and for carrying the said holder or catch-valve and the detent-latch, and since by this means said holder or valve may have a less stroke, and thus be more readily operated with a given scale-beam movement.

Having thus described our invention, we claim—

1. In a grain-weigher, the combination, with the scale-beam, of the hangers suspended therefrom, a drip-holder pivotally supported and carried by the hangers and having a catch arranged to engage a detent-latch, a detent-latch located to engage said drip-holder catch for holding the drip-holder clear of the descending column of grain, and a stop located to disengage said catch on the downward movement of the scale-beam, whereby the drip-holder is first held clear of the descending column of grain and on the downward movement of the scale-beam is disengaged and allowed to intercept said column.

2. In a grain-weigher, the combination, with the scale-beam, of the hangers suspended therefrom, a drip-holder, substantially as described, pivotally supported and carried by the hangers and having thereon stop-catches corresponding to successive positions of said holder, a detent-latch arranged to engage said catches successively for holding the drip-holder in successive positions, and a stop located to disengage said latch on the downward movement of the hangers, whereby the drip-holder is first held clear of the descending column of grain and is disengaged and allowed to intercept said column on the downward movement of the scale-beam.

3. In a grain-weigher, the combination, with the scale-beam, of the hangers suspended therefrom, the drip-holder, substantially as described pivotally supported and carried by the hangers and having two stop-catches corresponding to successive positions of said holder, a detent-latch located for engaging said catches, means, substantially as described, for moving the drip-holder on the unhooking of the catches, and a stop located to unhook the detent-latch on the downward movement of the scale-beam, and thereby allow the drip-holder to intercept the descending column of grain and to disengage the second catch on the further downward movement of the scale-beam, and thereby allow the drip-holder to discharge its load.

4. In a grain-weigher, the combination, with the supply-chute and the scale-beam and with a reducing-valve and a cut-off valve for the supply-chute, of the bag-holder suspended from the scale-beam and having the catch-pan carried therewith, and a catch-valve operatively connected to close the catch-pan on the closing of the reducing-valve and to open the same on the closing of the cut-off valve.

5. In a grain-weigher, the combination, with the scale-beam and the hangers suspended therefrom, of the catch-pan carried by the hangers, the catch-valve supported to close the discharge-outlet of said pan and having stops, substantially as described, a detent-latch carried by the hangers and engaging the valve, and a stop on the frame operating said latch on the descent of the scale-beam, whereby the valve is closed under the catch-pan on the downward movement of the scale-beam.

6. In a grain-weigher, the combination, with the scale-beam and the hangers suspended therefrom, of the catch-pan carried by the hangers, the catch-valve having two stop-catches corresponding to two successive positions of the valve, and a detent-latch arranged to engage said catches successively to hold the valve in successive positions, first open and then closed.

7. In a grain-weigher, the combination, with the scale-beam and with the hangers suspended therefrom, of the catch-pan carried by the hangers, the catch-valve supported to close said pan and having two catches arranged for locking the valve in successive positions, first open and then closed, a detent-latch, and a counter-weight arranged to close the valve on the unhooking of the first catch and to open the valve on the unhooking of the second catch.

8. In a grain-weigher, the combination, with the scale-beam, of the hangers suspended therefrom and carrying the catch-pan, the catch-valve supported substantially as described and having two stop-catches corresponding to two successive positions of the valve, one of said catches being located on a longer radius than the other, and a detent-latch supported substantially as described and arranged to engage said catches in succession, whereby one fixed stop on the frame first disengages the first catch on the downward movement of the scale-beam and afterward disengages the second catch on the farther downward movement of the scale-beam.

9. In a grain-weigher, the combination, with the scale-beam, of the hangers suspended therefrom and carrying a catch-pan, the catch-valve pivotally supported, substantially as described, and having two stop-catches corresponding to two successive positions of the valve, one of said catches being located on a longer radius than the other, a detent-latch supported substantially as described and arranged to engage said catches in succession, whereby one fixed stop on the frame first disengages the first catch on the downward movement of the scale-beam and afterward disengages the second catch on the further downward movement of the scale-beam, the latch-actuating stop, and a valve-actuating weight arranged to close the valve on the disengagement of the first catch and to open the valve by a continued movement thereof on the disengagement of the second catch, whereby the catch-valve is first closed and then opened by successive movements in the same direction.

10. In a grain-weigher, the combination, with the scale-beam, of the hangers suspended therefrom and carrying the catch-pan, the catch-valve pivotally supported, substantially as described, and having catches engaging a detent, whereby the valve is held in successive positions, a fixed abutment, and a lock-arm on the valve located to lock down the scale-beam by engaging said abutment on the final movement of the valve, whereby the supply-chute remains closed on removal of the load.

11. In a grain-weigher, the combination, with the scale-beam, of the hangers suspended therefrom and carrying the catch-pan, the catch-valve supported substantially as described and having catches engaging a detent, whereby the valve is held in successive positions, a fixed abutment having its face crosswise to the hanger movement, and a lock-arm located on the valve to come vertically under said abutment on the final movement of the valve to discharge the drip, and a handle for the valve, whereby to reset the mechanism, said handle and lock-arm together constituting a lever for controlling by hand the upward movement of the scale-beam.

12. In a grain-weigher, the combination, with the scale-beam and with the reducing-valve and the cut-off valve, each actuated, substantially as described, from said beam to be closed successively, of the hangers suspended from the scale-beam and carrying a catch-pan, the catch-valve for closing said pan, and means, substantially as described, for detaining said valve in successive positions, said means comprising a detent-arm and a stop located for operating said arm on the downward movement of the hangers, all organized and coacting, substantially as described, to close the catch-valve on the closing of the reducing-valve and to open the catch-valve on the closing of the cut-off valve, whereby the major part of the load passes through the catch-pan, and whereby the drip is retained in the catch-pan until the close of the weighing operation.

13. In a grain-weigher, the combination, with the supply-chute and the scale-beam and with the reducing-valve and the cut-off valve actuated to be opened by said beam on the upward movement thereof, said cut-off valve having a cam-arm, substantially as described, provided with two faces, one of which is neutral and the other effective in respect of the beam movement, whereby the weight of said arm is thrown onto the beam subsequent to the poising, of bag-holding devices suspended from the scale-beam and carrying drip-catching apparatus, substantially as set forth, and a detent operating to discharge the drip subsequent to the poising, all organized and co-acting substantially as set forth, whereby the drip is discharged by the force of said cam-arm bearing on the beam.

14. In a grain-weigher, the combination, with the supply-chute and the scale-beam and with the cut-off valve actuated to be opened by said beam on the upward movement thereof, of a cam-arm, substantially as described, provided with two faces, one of which is neutral and the other operative in respect of the scale-beam movement, said arm being located in the machine to bear its effective face on the scale-beam subsequent to the poising, bag-holding devices suspended from the scale-beam and carrying drip-catching apparatus, substantially as described, and a detent operating to discharge the drip subsequent to the poising, all organized and coacting substantially as set forth, whereby the detent is disengaged and the drip is discharged by the weight of said cam-arm transmitted to the scale-beam through said effective cam-face bearing on the beam subsequent to the poising.

15. In a grain-weigher, the combination, with the supply-chute and the scale-beam, of the hangers suspended from the scale-beam, jointed stay-rods connecting the lower ends of the hangers for resisting lateral movement thereof, a bag-holder carried by the hangers between the upper ends thereof, and a bag-seat carried on the hangers below the bag-holder and vertically adjustable on the hangers for holding bags of different sizes.

16. In a grain-weigher, the combination, with the scale-beam and the hangers supported thereon and carrying the bag-holder, of the cross-bar connecting the lower ends of the hangers, and a pair of jointed stay-rods connecting said bar with the frame for preventing lateral movement thereof.

17. In a grain-weigher, the combination, with hangers suspended from the scale-beam, of the catch-pan 365, fixed between the hangers, the bag-holder 370, carried by arms connected to the sides of the catch-pan, and the catch-valve pivotally supported on the catch-pan and swinging between the catch-pan and the bag-holder arms, said valve being provided with a handle for operating it.

CHARLES H. COOLEY.
FRANCIS H. RICHARDS.

Witnesses:
HENRY L. RECKARD,
W. M. BYORKMAN.